US011119825B2

(12) United States Patent
Jalali et al.

(10) Patent No.: US 11,119,825 B2
(45) Date of Patent: Sep. 14, 2021

(54) DYNAMIC TASK ALLOCATION AND NODE RECONFIGURATION IN MESH NETWORK

(71) Applicant: International Business Machines Corporation, Armonk, NY (US)

(72) Inventors: Fatemeh Jalali, Hawthorn East (AU); Timothy M. Lynar, Melbourne (AU); Frank Suits, Brighton (AU); Ramachandra Rao Kolluri, Balaclava (AU)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 15/847,052

(22) Filed: Dec. 19, 2017

(65) Prior Publication Data
US 2019/0188043 A1 Jun. 20, 2019

(51) Int. Cl.
*G06F 9/50* (2006.01)
*H04W 72/04* (2009.01)
(Continued)

(52) U.S. Cl.
CPC ............ *G06F 9/5044* (2013.01); *H04L 45/00* (2013.01); *H04W 40/18* (2013.01); *H04W 40/20* (2013.01);
(Continued)

(58) Field of Classification Search
CPC ...................................................... G04F 16/29
(Continued)

(56) References Cited

U.S. PATENT DOCUMENTS 7,336,613 B2  2/2008  Lloyd et al.
7,403,988 B1  7/2008  Blouin et al.
(Continued)

OTHER PUBLICATIONS

M.J. Feeley, et al., "Dynamic Node Reconfiguration in a Parallel-Distributed Environment." Proceeding PPOPP '91 Proceedings of the third ACM SIGPLAN symposium on Principles and practice of parallel programming, Apr. 21-24, 1991, pp. 114-121, Williamsburg, Virginia, USA.
(Continued)

*Primary Examiner* — Moustafa M Meky
*Assistant Examiner* — Sm Z Islam
(74) *Attorney, Agent, or Firm* — Joseph Petrokaitis; Ryan, Mason & Lewis, LLP

(57) ABSTRACT

A system for allocating tasks within a moving multi-hop mesh network includes a processor operatively coupled to memory. The processor is configured to implement the steps of: sending a bid request from a first network node to two or more other network nodes for computing a task, wherein the first network node has a first geographical location relative to a first geographical location of the two or more other network nodes; in response to the first network node receiving a bid from at least two of the two or more other network nodes for computing the task; predicting a second geographical location for each of the at least two of the two or more other network nodes relative to a second geographical location of the first network node based on the time when the task will be completed; predicting a total task completion time for the at least two of the two or more other network nodes; comparing the total task completion time predicted for the at least two of the two or more other network nodes to generate a winning bid; and allocating the task to the winning bid.

20 Claims, 6 Drawing Sheets

(51) Int. Cl.
*H04L 12/701* (2013.01)
*H04W 40/18* (2009.01)
*H04W 40/20* (2009.01)
*H04W 64/00* (2009.01)
*H04W 84/00* (2009.01)
*H04M 1/02* (2006.01)
*H04W 84/18* (2009.01)

(52) U.S. Cl.
CPC ....... *H04W 72/04* (2013.01); *G06F 2209/501* (2013.01); *H04M 1/0202* (2013.01); *H04W 64/00* (2013.01); *H04W 84/005* (2013.01); *H04W 84/18* (2013.01)

(58) Field of Classification Search
USPC ........................................................ 709/245
See application file for complete search history.

(56) References Cited

U.S. PATENT DOCUMENTS

| | | | |
|---|---|---|---|
| 7,681,203 | B2 | 3/2010 | Mandato et al. |
| 9,996,858 | B1* | 6/2018 | Flowerday ......... G06Q 30/0255 |
| 2004/0177244 | A1 | 9/2004 | Murphy et al. |
| 2007/0253341 | A1* | 11/2007 | Atkinson ................ H04L 45/02 370/252 |
| 2009/0300173 | A1 | 12/2009 | Bakman et al. |
| 2010/0131590 | A1 | 5/2010 | Coleman et al. |
| 2012/0022965 | A1* | 1/2012 | Seergy ............... G06Q 30/0639 705/26.4 |
| 2014/0289733 | A1* | 9/2014 | Fritz ..................... G06F 9/5066 718/104 |
| 2015/0161555 | A1* | 6/2015 | Cui ............... G06Q 10/063118 705/7.17 |
| 2016/0019094 | A1* | 1/2016 | Habdank .............. G06F 9/5083 718/104 |
| 2016/0103705 | A1* | 4/2016 | Wang .................... G06F 9/4856 718/104 |
| 2016/0295448 | A1* | 10/2016 | Cai ................... H04W 28/0226 |

OTHER PUBLICATIONS

H. Zhang, et al., "Computing Resource Allocation in Three-Tier IoT Fog Networks: a Joint Optimization Approach Combining Stackelberg Game and Matching," submitted Jan. 14, 2017) https://arxiv.org/abs/1701.03922.

M. Aazam, et al., "Fog Computing Micro Datacenter Based Dynamic Resource Estimation and Pricing Model for IoT." 2015 IEEE 29th International Conference on Advanced Information Networking and Applications (AINA), pp. 688-694, Date of Conference: Mar. 24-27, 2015.

M. Yannuzzi, et al. "Key ingredients in an IoT recipe: Fog Computing, Cloud Computing, and more Fog Computing." IEEE 19th International Workshop on Computer Aided Modeling and Design of Communication Links and Networks (CAMAD), Dec. 1-3, 2014, pp. 325-329.

N. Mohan, et al., "Edge-Fog Cloud: A Distributed Cloud for Internet of Things Computations." Cloudification of the Internet of Things (IEEE CIoT), Nov. 23-25, 2016, 6 pages.

X. Sun, "PRIMAL: PRofit Maximization Avatar pLacement for mobile edge computing." Communications (ICC), 2016 IEEE International Conference on Date of Conference: May 22-27, 2016, 6 pages.

M. Verma, et al., "Real Time Efficient Scheduling Algorithm for Load Balancing in Fog Computing Environment," MECS Publisher, I.J. Information Technology and Computer Science, Apr. 2016, pp. 1-10, vol. 8, No. 4.

S. Ningning, et al., "Fog computing dynamic load balancing mechanism based on graph repartitioning," China Communications, Mar. 2016, pp. 156-164, vol. 13, Issue: 3.

A. Asheralieva, et al., "A Predictive Network Resource Allocation Technique for Cognitive Wireless Net." 2010 4th International Conference on Signal Processing and Communication Systems (ICSPCS), Date of Conference: Dec. 13-15, 2010.

Anonymous, "Method and System for Offloading Jobs from Data Centers to Individual Computing Nodes." IP.com No. IPCOM000248597D. IP.com Electronic Publication Date: Dec. 21, 2016.

T. Nishio, et al., "Service-oriented heterogeneous resource sharing for optimizing service latency in mobile cloud." Proceeding MobileCloud '13 Proceedings of the first international workshop on Mobile cloud computing & networking. Jul. 29-29, 2013, pp. 19-26. Bangalore, India.

N. Mohan, et al., "Managing Data in Computational Edge Clouds," Proceeding MECOMM '17 Proceedings of the Workshop on Mobile Edge Communications, Aug. 21, 2017, pp. 19-24. Los Angeles, CA, USA.

M. Franceschelli, et al., "Distributed Task Assignment Based on Gossip with Guaranteed Performance on Heterogeneous Networks." ADHS15: 5th IFAC Conference on Analysis and Design of Hybrid Systems (Atlanta, GA, USA), Oct. 14-16, 2015.

\* cited by examiner

100

100

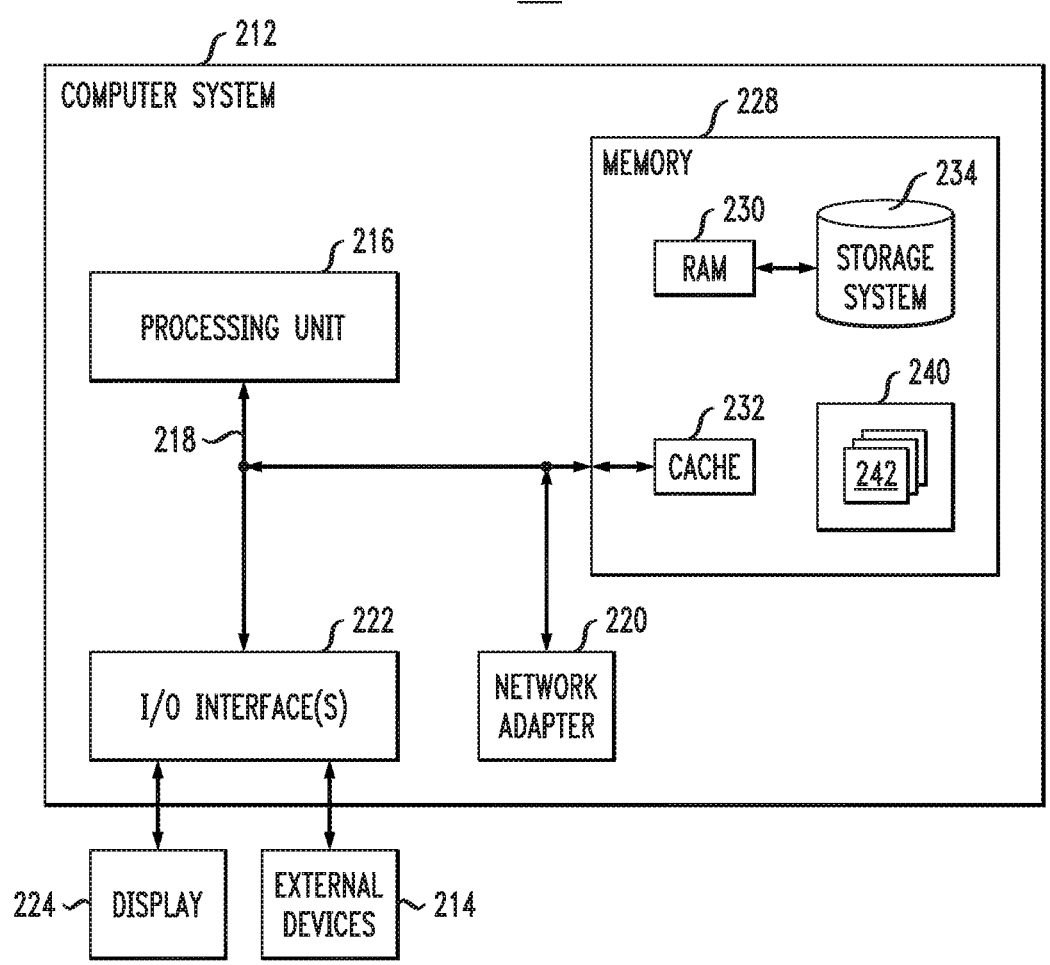

DYNAMIC TASK ALLOCATION AND NODE RECONFIGURATION IN MESH NETWORK

BACKGROUND

This present application generally relates to a system and method for dynamic task allocation and node reconfiguration in a communication network environment. For example, the communication network environment may be an Internet of Things (IoT) environment running on a mesh network with moving nodes.

The idea of offloading computation to nearby resources has been proposed for mobile networks. However, most of the schemes for task allocation are based on the rule that the location of the nodes is fixed. For example, offloading data/computation from mobile phone to centralized servers which are generally immobile. The location of nodes in a mobile IoT network can quickly change and there is no control of the node locations. This means that if a node offloads its task to a nearby node, that node might not be nearby anymore when the task completes, since both the requester node and/or the compute node might move.

The time for completing a task includes (1) the time for transmitting input data to the compute node; (2) computation time; and (3) the time for receiving the output data from the compute node. In a wireless network, many factors can impact the transmission/reception time. For example, the distance between nodes, the communication protocols, the bandwidth allocation, etc., can impact the transmission/reception times. Therefore, the location of nodes at the beginning of the task and the location of the nodes at the end of the task completion can be important.

Accordingly, it is desirable to improve existing mobile IoT domain running over a moving mesh network to predict the location of a node that requested the task and other participating nodes that can execute the task in order to complete the task as quickly as possible.

SUMMARY

Illustrative embodiments of the invention provide techniques for allocating one or more tasks to network resources within a moving multi-hop mesh network. While illustrative embodiments are well-suited to allocate tasks to network resources within a moving multi-hop mesh network, alternative embodiments may be implemented.

For example, one exemplary embodiment includes a method for allocating tasks within a moving multi-hop mesh network. The first step includes sending a bid request from a first network node to two or more other network nodes for computing a task, wherein the first network node has a first geographical location relative to a first geographical location of the two or more other network nodes. The second step includes in response to the first network node receiving a bid from at least two of the two or more other network nodes for computing the task; predicting a second geographical location for each of the at least two of the two or more other network nodes relative to a second geographical location of the first network node based on the time when the task will be completed. The third step includes predicting a total task completion time including a time taken for the first network node to send data to the at least two of the two or more other network nodes for computing the task based on the first geographical location; a computation time for the at least two of the two or more other network nodes to compute the task; and a time taken for the at least two of the two or more other network nodes to send the output data for the completed task to the first network node from the second geographical location. The fourth step includes comparing the total task completion time predicted for each of the two nodes of the two or more other network nodes to generate a winning bid. The fifth step includes allocating the task to a winning bid. Each of the steps of the method are performed in accordance with a processor and a memory.

Another exemplary embodiment includes a method for allocating tasks within a moving multi-hop mesh network. The first step includes in response to receiving a bid request from a first network node to two or more other network nodes for computing a task, wherein the first network node has a first geographical location relative to a first geographical location of the two or more other network nodes, sending a bid from at least two of the two or more other network nodes to the first network node for computing the task; predicting a second geographical location for each of the at least two of the two or more other network nodes relative to a second geographical location of the first network node based on the time when the task will be completed. The third step includes predicting a total task completion time including a time taken for the first network node to send data to the at least two of the two or more other network nodes for computing the task based on the first geographical location; a computation time for the at least two of the two or more other network nodes to compute the task; and a time taken for the at least two of the two or more other network nodes to send the output data for the completed task to the first network node from the second geographical location. The fourth step includes comparing the total task completion time predicted for each of the two nodes of the two or more other network nodes to generate a winning bid. The fifth step includes allocating the task to a winning bid. Each of the steps of the method are performed in accordance with a processor and a memory.

Another exemplary embodiment includes a system for allocating tasks within a moving multi-hop mesh network which comprises: a memory and a processor. The processor is operatively coupled to the memory and configured to implement the step of sending a bid request from a first network node to two or more other network nodes for computing a task, wherein the first network node has a first geographical location relative to a first geographical location of the two or more other network nodes. The processor is operatively coupled to the memory and configured to implement the step of in response to the first network node receiving a bid from at least two of the two or more other network nodes for computing the task; predict a second geographical location for each of the at least two of the two or more other network nodes relative to a second geographical location of the first network node based on the time when the task will be completed. The processor is operatively coupled to the memory and configured to implement the step of predicting a total task completion time including a time taken for the first network node to send data to the at least two of the two or more other network nodes for computing the task based on the first geographical location; a computation time for the at least two of the two or more other network nodes to compute the task; and a time taken for the at least two of the two or more other network nodes to send the output data for the completed task to the first network node from the second geographical location. The processor is operatively coupled to the memory and configured to implement the step of comparing the total task completion time predicted for each of the two nodes of the two or more other network nodes to generate a winning bid. The processor is operatively coupled to the memory and configured to implement the step of allocating the task to a winning bid.

Another exemplary embodiment includes an article of manufacture to provide optimal aggregation of small-scale energy storage capacity. The article of manufacture includes a computer-readable storage medium for storing computer-readable program code which, when executed, causes a computer to send a bid request from a first network node to two or more other network nodes for computing a task, wherein the first network node has a first geographical location relative to a first geographical location of the two or more other network nodes. The computer is further caused to in response to the first network node receiving a bid from at least two of the two or more other network nodes for computing the task; predicting a second geographical location for each of the at least two of the two or more other network nodes relative to a second geographical location of the first network node based on the time when the task will be completed. The computer is further caused to predict a total task completion time including a time taken for the first network node to send input data to the at least two of the two or more other network nodes for computing the task based on the first geographical location; a computation time for the at least two of the two or more other network nodes to compute the task; and a time taken for the at least two of the two or more other network nodes to send the output data for the completed task to the first network node from the second geographical location. The computer is further caused to compare the total task completion time predicted for each of the two nodes of the two or more other network nodes to generate a winning bid. The computer is further caused to allocate the task to a winning bid.

These and other features, objects and advantages of the present invention will become apparent from the following detailed description of illustrative embodiments thereof, which is to be read in connection with the accompanying drawings.

BRIEF DESCRIPTION OF THE DRAWINGS

FIG. 2 depicts a computer system in accordance with which one or more components/steps of techniques of the invention which may be implemented according to an embodiment of the invention.

DETAILED DESCRIPTION

Embodiments of the present invention will now be described in further detail with regard to systems and methods for allocating one or more tasks to network resources within a moving multi-hop mesh network. Features of the embodiments of the present invention allow the systems and methods to allocate one or more tasks to network resources within a moving multi-hop mesh network. A wireless mesh network (WMN) is a communications network made up of radio nodes organized in a mesh topology. A mesh network is a local network topology in which the infrastructure nodes (i.e., bridges, switches and other infrastructure devices) connect directly, dynamically and non-hierarchically to as many other nodes as possible and cooperate with one another to efficiently route data from/to clients.

Figure 1A:
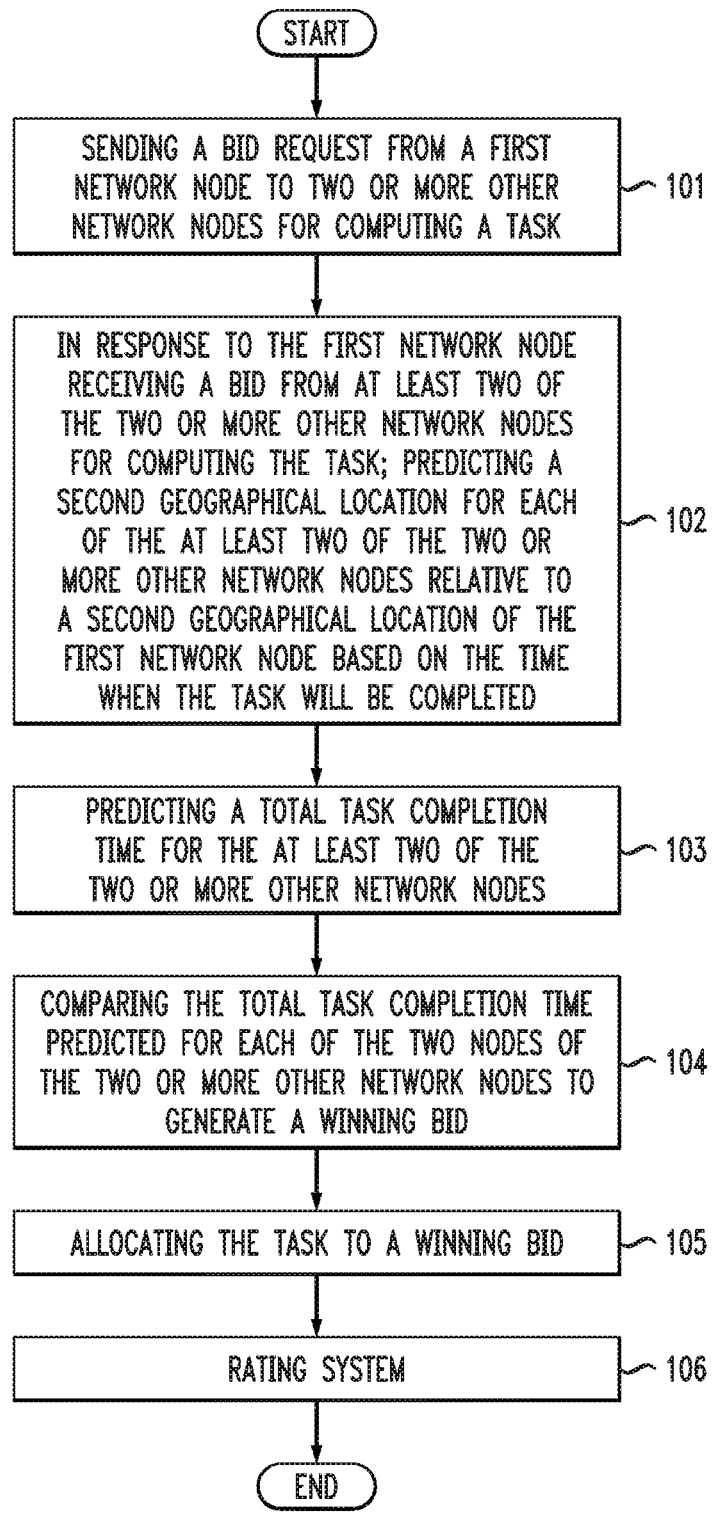
FIG. 1A shows a flow diagram illustrating a method for allocating tasks within a moving multi-hop mesh network, according to an embodiment of the invention.

The method of the present invention is generally illustrated according to the flow diagram of FIG. 1A, and shown in the mesh network 100 of FIGS. 1B-1E which is configured to allocate one or more tasks to network resources within a moving multi-hop mesh network. The systems and methods described herein may be implemented in hardware, software (e.g., firmware), or a combination thereof. In some embodiments, the methods described may be implemented, at least in part, in hardware and may be part of a microprocessor of a special or general-purpose computer system, such as a personal computer, workstation, minicomputer, or mainframe computer. The mesh network 100 can include an access point, such as a cellular tower. The access point can have a range where signals to and from network nodes 110, 120, 130, 140 and 150 on the network can be transmitted and received. As will be understood, the mesh network 100 may include additional remote nodes (not shown) that are outside of the range of the access point. These remote nodes may not be able to communicate directly with the access point due to obstructions, such as geographic obstructions (e.g., a hill) or man-made obstructions (e.g., buildings, concrete walls). To send and receive signals from the mesh network 10020, network nodes 110, 120, 130, 140 and 150 can relay the signals to and from the access point.

It should be appreciated that while the mesh network 100 may be described herein as a cellular network, this is for exemplary purposes and should be not so limited. In some embodiments, the mesh network 100 may be a managed IP network administered by a service provider. The mesh network 100 may be implemented in a wireless fashion, e.g., using wireless protocols and technologies, such as WiFi, WiMax, AM radio, FM radio, television, Bluetooth, two-way radio, and satellite signals such as GPS. The mesh network 100 may also be a packet-switched network such as a local area network, wide area network, metropolitan area network, the Internet, or other similar type of network environment. The mesh network 100 may be a fixed wireless network, a wireless local area network (LAN), a wireless wide area network (WAN) a personal area network (PAN), a virtual private network (VPN), intranet or other suitable network system and may include equipment for receiving and transmitting signals. Further, while embodiments herein may refer to cellular phone devices as the network node, the network node may also be, for example, tablet computers, laptop computers, repeaters, personal digital assistants (PDA), scanners, network connected appliances or other devices that include computing circuitry that are configured to wirelessly communicate with one or more other devices.

The access point is coupled to a network and is configured to transmit signals between the mesh network 100 and the network nodes 110, 120, 130, 140 and 150. Network 160 may include permanent connections, such as wire or fiber optic cables, or temporary connections made through telephone or wireless communications. The network may represent a worldwide collection of networks and gateways, such as a global network (e.g., Internet), or a virtual private network (VPN), that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. The network may also include a number of different types of networks, such as, for example, an intranet, a local area network (LAN), or a wide area network (WAN). The network may also include a cloud computing environment, for example, cloud computing environment. Thus, the network can be coupled to the access point by any known network including, but not limited to, a wide area network (WAN), a public switched telephone network (PSTN), a local area network (LAN), and an intranet. The network coupled to the access point may be implemented using a wireless network or any kind of physical network implementation known in the art. As will be understood, a computing device, such as a computer for example, having a processor and memory is connected to the network coupled to the access point and provides centralized monitoring and management control functionality for the mesh network 100.

Figure 1B:
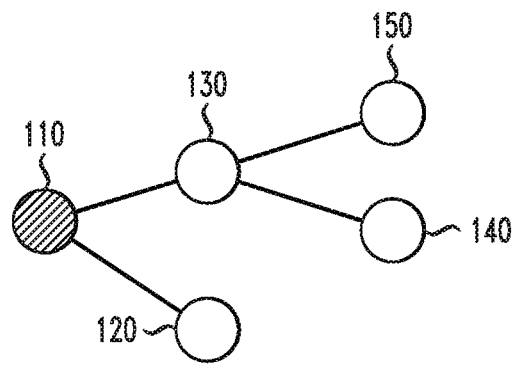
FIG. 1B shows a diagram illustrating a first step of the method for allocating tasks within a moving multi-hop mesh network, according to an embodiment of the invention.

As shown in the illustrative embodiment of FIGS. 1A and 1B, in mesh network 100, network node 110, i.e., the requester node, will send a bid request to two or more other network nodes for computing a task in step 101. For example, a task can be an image recognition in a photo/video sent from the requester node or doing analytics and mathematical modeling on the data sent from the requester node to the other network nodes for computing the task. As illustrated in FIG. 1B, the two or more other nodes are nodes 120, 130, 140 and 150. However, the number of nodes exemplified in FIG. 1B is for illustrative purposes only. One skilled in the art would understand that a network can consist of up to 10 or more, or up to 100 or more, or up to 1000 or more or up to 100,000 or more nodes.

It should be appreciated that while embodiments herein may refer to the nodes 110, 120, 130, 140 and 150 as a particular type of device, such as a cellular or mobile phone, this is for exemplary purposes and should not be so limited. In some embodiments, the nodes may be homogenous (e.g., all cellular phones) or non-homogenous (e.g., a mixture of devices, such as cellular phones, laptop computers, tablet computers, drones, robots, IoT sensors, etc.). The devices can receive input from the requester node, or Cloud resource consumer, display data in a graphical user interface, or GUI, or communicate over the network, via an application window or web browser.

Bid requests are sent by receiving or identifying device information, user information, and/or location information. In one embodiment, bid requests are calculated or determined based on receiving information about the current and future location of the nodes, and also information about the task (e.g., the required computation, the completion time, the type of application, delay sensitive or not, etc.) as well as obtaining information on the available resources (e.g., computation and battery, etc.) of the potential compute node(s). In one embodiment, the bid requests are broadcast or sent as a sealed bid, i.e., the bids are sent to a subset of the network only. In another embodiment, the bid requests are broadcast or sent to all of the nodes that are present in the network.

In one embodiment, the bid request sent by requester node 110 to nodes 120, 130, 140 and 150 can be carried out by real-time communication protocol which includes an Instant Messaging protocol. For example, messages between requester node 110 and nodes 120, 130, 140 and 150 can be communicated via an intermediary server. In another embodiment, the real-time communication protocol can include a peer-to-peer protocol, wherein messages between the user and the network-based commerce system are communicated directly without the need for any intermediary IM server. In one embodiment, the communicated messages from requester node 110 to nodes 120, 130, 140 and 150 include one or more of a text message, voice message, audio message, video, data and encrypted message. In one embodiment, the communicated messages from the requester node 110 to nodes 120, 130, 140 and 150 include text messages. In one embodiment, the communicated messages from requester node 110 to nodes 120, 130, 140 and 150 include voice messages. In one embodiment, the communicated messages from the requester node 110 to nodes 120, 130, 140 and 150 include a secure channel.

In addition, the requester node 110 will have a first geographical location or orientation relative to a first geographical location of each of nodes 120, 130, 140 and 150. That is, each of the requester node 110 and nodes 120, 130, 140 and 150 will have their own geographical location with the geographical location of the requester node 110 being relative to the geographical location of each of nodes 120, 130, 140 and 150. In one embodiment, the first geographical location for requester node 110 relative to the first geographical location of each of nodes 120, 130, 140 and 150 is a function of one or more variables. For example, a node pair orientation or geographical location can be determined according to node mobility information associated with each node in the network. In one embodiment, node mobility information includes node geographical location, node trajectory, node speed, and like node mobility parameters, as well as various combinations thereof. For example, node mobility information can be recorded periodically at discreet times to build a model of historical data. In one embodiment, a node pair orientation or first geographical location can be determined by a location tracking system or unique identification of the first network node and the two or more other network nodes. For example, a unique identification can be based on a Media Access Control (MAC) address or an IP address of the nodes.

Figure 1C:
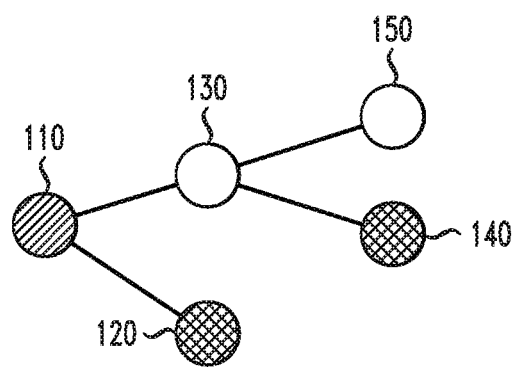
FIG. 1C shows a diagram illustrating a second step of the method for allocating tasks within a moving multi-hop mesh network, according to an embodiment of the invention.

With reference to FIG. 1C, a bid is sent to the requester node from at least two of the two or more other network nodes for computing the task. In this illustrative embodiment, requester node 110 will received a bid from potential compute nodes 120 and 140. Factors to be considered in sending a bid include, for example, location of the network nodes, computational power of the potential compute nodes relative to the requester node and available power/battery of the potential compute nodes. In one embodiment, potential compute nodes 120 and 140 will have the same or similar computation power. Therefore, in one embodiment, the time for sending the input data and the time for receiving the output data are factors to be considered. In one embodiment, the bid received from requester node 110 by potential compute nodes 120 and 140 can be carried out in the same or similar manner as the bid requests were sent out by requester node 110 to nodes 120, 130, 140 and 150. For example, messages between the potential compute nodes 120 and 140 and requester node 110 can be communicated via an intermediary server. In another embodiment, a real-time communication protocol can include a peer-to-peer protocol, wherein messages between the user and the network-based commerce system are communicated directly without the need for any intermediary IM server. In one embodiment, the communicated messages from the potential compute nodes 120 and 140 to requester node 110 include one or more of a text message, voice message, audio message, video, data and encrypted message. In one embodiment, the communicated messages from the potential compute nodes 120 and 140 to requester node 110 include text messages. In one embodiment, the communicated messages from the potential compute nodes 120 and 140 to requester node 110 include voice messages. In one embodiment, the communicated messages from the potential compute nodes 120 and 140 to requester node 110 include a secure channel.

Figure 1D:
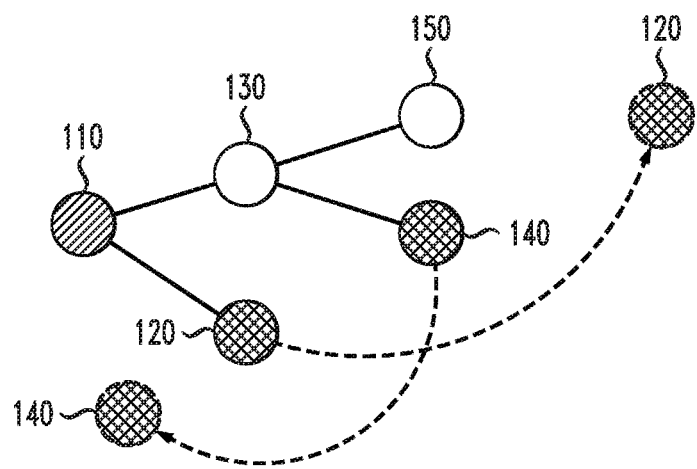
FIG. 1D shows a diagram illustrating a third step of the method for allocating tasks within a moving multi-hop mesh network, according to an embodiment of the invention.

With reference to FIGS. 1A and 1D, a second geographical location for each of potential compute nodes 120 and 140 relative to a second geographical location of the requester node 110 will be predicted based on when the computation task will be completed in step 102. As one skilled in the art will readily appreciate, one or more of nodes 110, 120, 130, 140 and 150 as used herein can be moving nodes such as mobile devices, laptops, tablets, drones, robots, etc. These devices can be at a different location from the time the bid request is sent until the time the task is completed. Accordingly, this step predicts a second geographical location of the potential compute nodes 120 and 140 and requester node 110 for when the time the task is completed. For example, the time required to complete a task can be based on the task attributes such as, size of the task, computation power required to complete the task, etc. This information is known from the bid and the request-for-bid as discussed above. If information is not available for the current bid, historical data can also be utilized to estimate this parameter for a given task. In one embodiment, the future locations can be predicted by a location tracking system using machine learning techniques or heuristics when enough historical data about the node movement over a period of time has been obtained.

In addition, some IoT applications are time-sensitive and if the task is not completed in a certain time, then there will be no need to continue the task computation. Thus, a time period can be identified as the task completion time. In some other IoT applications most of the tasks are repetitive and the task completion can be estimated using historical data of the same tasks that were previously completed.

In another embodiment, the node pair orientation or second geographical location determined for potential compute nodes 120 and 140 and requester node 110 can be based on a location tracking system or unique identification of the first network node and the two or more other network nodes. For example, a unique identification can be based on a MAC address or an IP address of the nodes as discussed above.

Figure 1E:
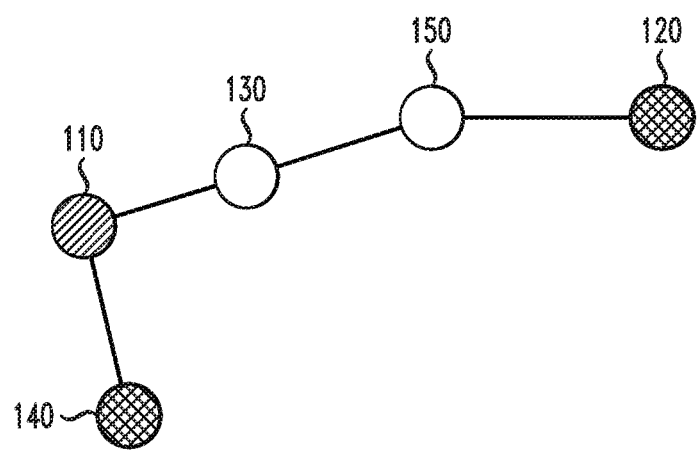
FIG. 1E shows a diagram illustrating a fourth step of the method for allocating tasks within a moving multi-hop mesh network, according to an embodiment of the invention.

With reference to FIG. 1E, once the second geographical location has been predicted for potential compute nodes 120 and 140 relative to a second geographical location of the requester node 110, a total task completion time for potential compute nodes 120 and 140 can be predicted in step 103 to determine which bid made by potential compute nodes 120 and 140 will be accepted in step 104. In one embodiment, the prediction of the time for task completion can be based on at least the following three factors: (1) a time to transfer the data from the requester node to the compute node to determine if a bid request should be sent; (2) a computational time for the compute node to complete the task; and (3) a time to transfer the results or data from the compute node to the requester node. Accordingly, in one embodiment, predicting a total task completion time comprises (a) a time taken for the requester node 110 to send data to the at least two compute nodes 120 and 140 for computing the task based on the first geographical location; (b) a computation time for the at least two compute nodes 120 and 140 to compute the task; and (c) a time taken for the at least two compute nodes 120 and 140 to send the output data for the completed task to the requester node 110 from the second geographical location. In one embodiment, the prediction of the time to transfer the data from the requester node to the compute node, or from the compute node to the requester node, can be based on such factors as the speed of the wireless connection between the nodes or bandwidth, task size as well as the number of hops from the requester node to the compute node. The bandwidth is limited by the lowest bandwidth of all intermediate connections in a multi-hop network.

Once the total task completion time is predicted, the predicted total task completion time by potential compute nodes 120 and 140 are compared to determine which bid will be accepted in step 104. For example, the bids can be weighed together with the predicted wall time (i.e., the total execution time or runtime for which the central processing unit (CPU) was dedicated to a process). The accepted bid for potential compute nodes 120 and 140 will be one in which is the shortest predicted total task completion time. In other words, after the requester node 110 receives one or more bids from the potential compute nodes and accepts the bid based on the shortest predicted total task completion time (i.e., the bids are predicted considering the future locations of the nodes and other factors as discussed above). Accordingly, the accepted bid will then be transmitted to one of potential compute nodes 120 and 140 by requested node 110. In the event that the bids are equal or almost equal, then determining factors for which bid will be accepted will be evaluated. For example, models built on historical data of past performance for each node can be analyzed, e.g., the types of tasks completed, the time to complete the tasks, etc., to determine which node can best complete the task. Once the winning bid is generated, the task is allocated to the winning bid in step 105. This will drive network connections in the future in such a way that the task is completed by the node with winning bid.

If desired, as rating system can be built based on the performances of each node in step 106. For example, the rating system can be based on a model of factors such as how many bids were won, the time the task was completed versus the predicted time, how many bid requests were received by the node, etc. In this manner, a historical data model is built which can be used in the future in the event that a bid from one node is equal to the bid of another node.

As shown in FIG. 2, system/server 212 is shown in the form of a computing device 210. The components of system/server 212 may include, but are not limited to, one or more processors or processing units 216, system memory 228, and bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 212 typically includes a variety of computer system readable media. Such media may be any available media that is accessible by system/server 212, and it includes both volatile and non-volatile media, removable and non-removable media.

The system memory 228 can include computer system readable media in the form of volatile memory, such as random access memory (RAM) 230 and/or cache memory 232. System/server 212 may further include other removable/non-removable, volatile/nonvolatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces.

As depicted and described herein, memory 228 may include at least one program product having a set (e.g., at least one) of program modules that are configured to carry out the functions of embodiments of the invention. A program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

System/server 212 may also communicate with one or more external devices 214 such as a keyboard, a pointing device, an external data storage device (e.g., a USB drive), display 224, one or more devices that enable a user to interact with system/server 212, and/or any devices (e.g., network card, modem, etc.) that enable system/server 212 to communicate with one or more other computing devices. Such communication can occur via I/O interfaces 222. Still yet, system/server 212 can communicate with one or more networks such as a LAN, a general WAN, and/or a public network (e.g., the Internet) via network adapter 220. As depicted, network adapter 220 communicates with the other components of system/server 212 via bus 218. It should be understood that although not shown, other hardware and/or software components could be used in conjunction with system/server 212. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
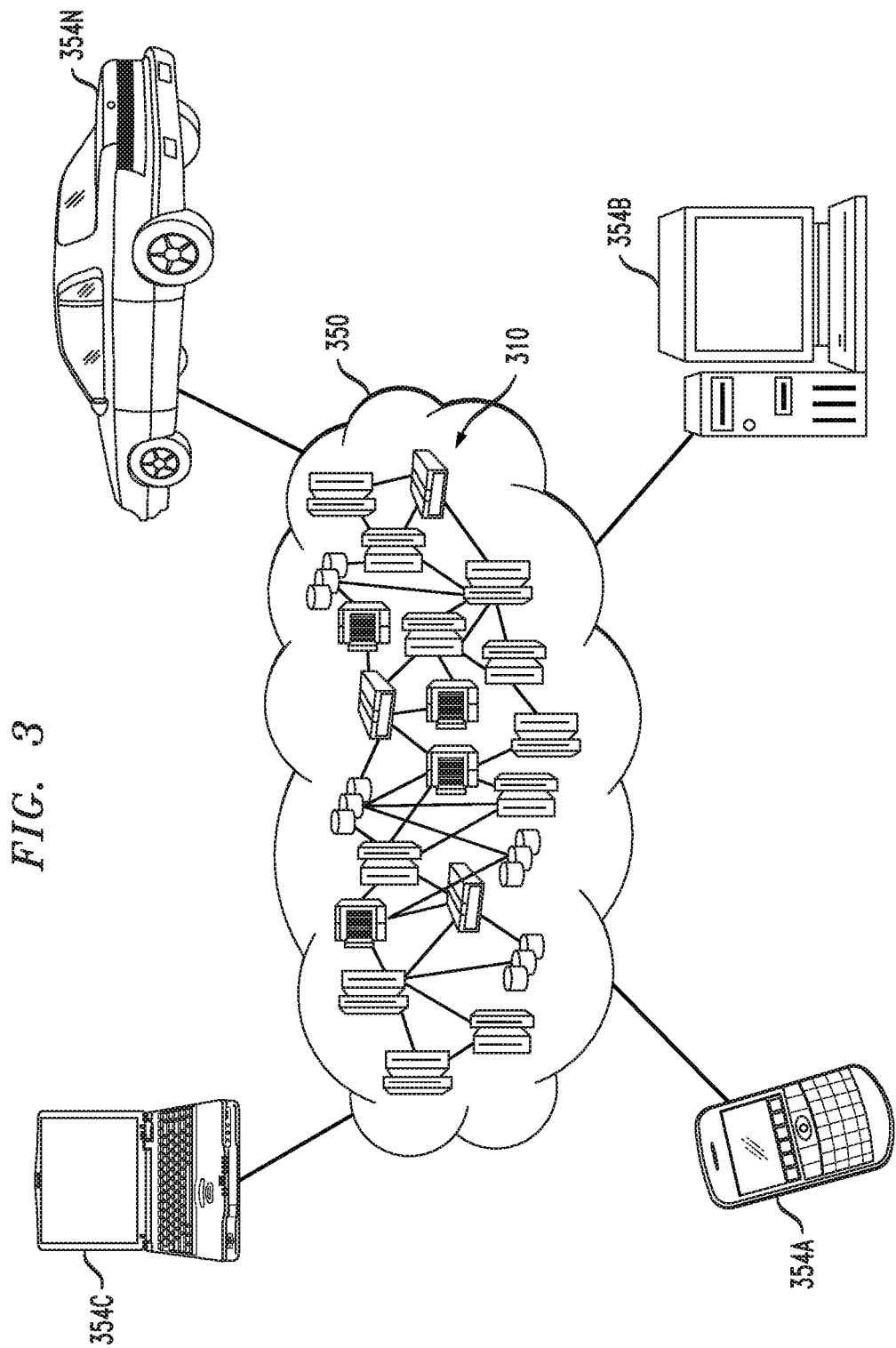
FIG. 3 depicts a cloud computing environment according to an embodiment of the invention.

Referring now to FIG. 3, illustrative cloud computing environment 350 is depicted. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Figure 4:
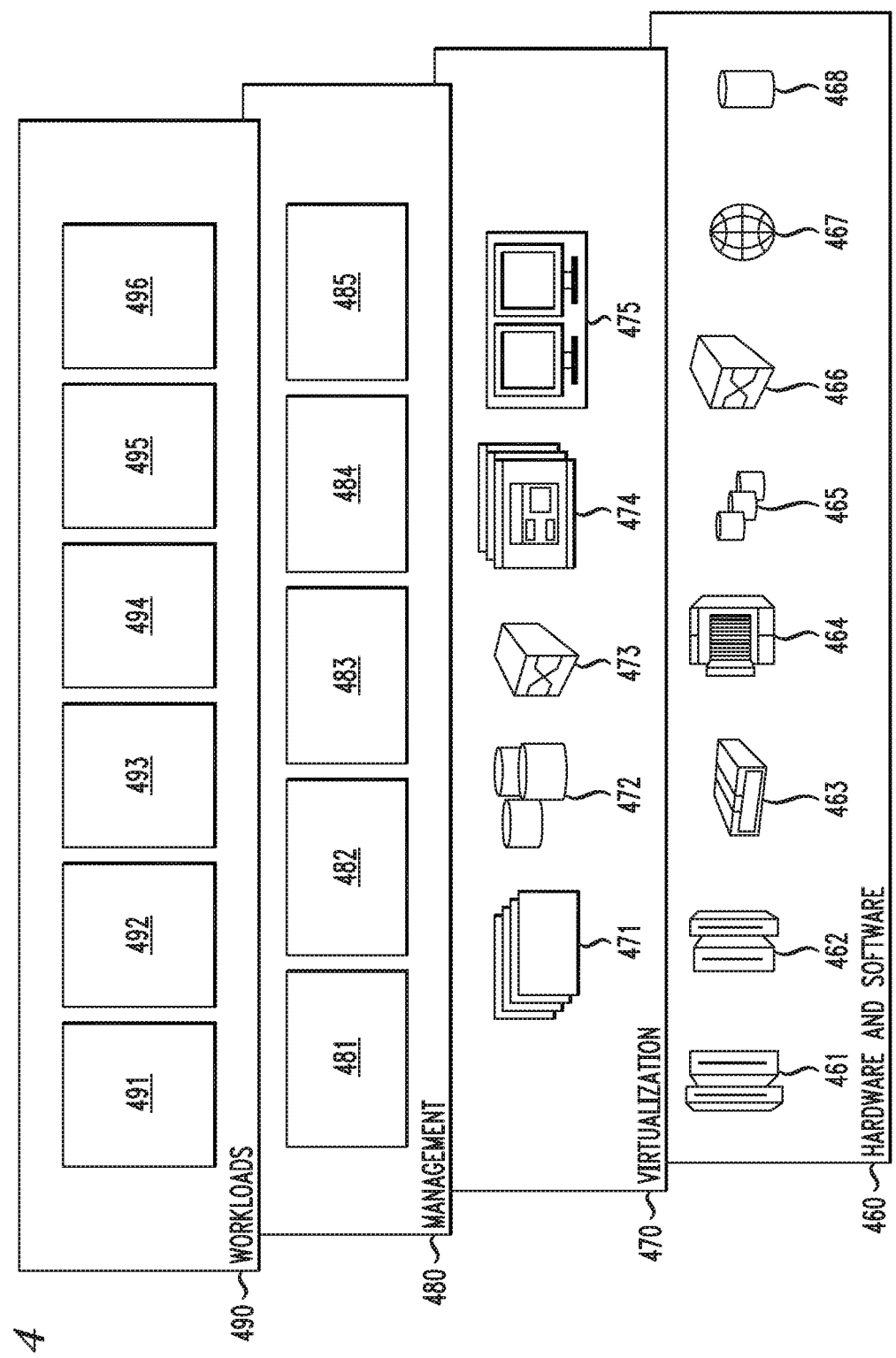
FIG. 4 depicts abstraction model layers according to an embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: transaction data capture 491; blockchain computation 492; data analytics processing 493; risk assessment 494; alert processing 495; and ameliorative/corrective/remedial action implementation 496, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams, and combinations of blocks in the diagrams, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in art without departing from the scope or spirit of the invention.

What is claimed is:

1. A method for allocating tasks to network resources within a moving multi-hop mesh network comprising:
   sending a task-compute request from a first network node to two or more other network nodes for computing a task, wherein the first network node and the two or more other network nodes are mobile nodes, wherein the first network node has a first geographical location relative to a first geographical location of the two or more other network nodes, and wherein the first network node and the two or more other network nodes are configured for communication with each other via a communication mesh network;
   in response to the first network node receiving a task-compute offer from at least two of the two or more other network nodes for computing the task, predicting a second geographical location for each of the at least two of the two or more other network nodes relative to a second geographical location of the first network node based on a time when the task will be completed;
   predicting a total task completion time for the predicted second geographical location of the at least two of the two or more other network nodes comprising:

a time taken for the first network node to send data to the at least two of the two or more other network nodes for computing the task based on the first geographical location;

a computation time for the at least two of the two or more other network nodes to compute the task; and a time taken for the at least two of the two or more other network nodes to send the output data for the completed task to the first network node from the second geographical location;

comparing the total task completion time predicted for the at least two of the two or more other network nodes to generate an acceptance of the task-compute offer from a given one of the two or more other network nodes; and allocating the task to network resources to the accepted task-compute offer;

wherein predicting the second geographical location of the at least two of the two or more other network nodes relative to the second geographical location of the first network node is determined according to node mobility information associated with each node in the network, the node mobility information comprising one or more of node trajectory and node speed; and wherein the steps of the method are performed in accordance with a processor and a memory.

2. The method of claim 1, wherein each of the first network node and the two or more other network nodes are independently one of a cellular phone, tablet, laptop, desktop computer, drones and robots.

3. The method of claim 1, wherein each of the first network node and the two or more other network nodes are independently a cellular phone.

4. The method of claim 1, wherein the step of sending the task-compute request from the first network node to the two or more other network nodes for computing the task comprises receiving location information of the two or more other nodes.

5. The method of claim 1, wherein the step of sending the task-compute request from the first network node to the two or more other network nodes for computing the task comprises sending communicated messages by one or more of a text message, voice message, audio message, video, data and encrypted message.

6. The method of claim 1, wherein the step of sending the task-compute request from the at least two of the two or more other network nodes to the first network node comprises sending communicated messages by one or more of a text message, voice message, audio message, video, data and encrypted message.

7. The method of claim 1, wherein the first geographical location of the first network node and the first geographical location of the two or more other network nodes is determined by a unique identification of the first network node and the two or more other network nodes.

8. The method of claim 1, further comprising sending a notification that a node's task-compute offer is the accepted task-compute offer, and wherein the notification provides the node with further instruction to proceed with the computed task.

9. The method of claim 1, further comprising generating a rating system of the two or more other nodes.

10. An article of manufacture to provide optimal aggregation of small-scale energy storage capacity comprising a non-transitory computer-readable storage medium for storing computer-readable program code which, when executed, causes a computer to carry out the steps according to claim 1.

11. A method for allocating tasks to network resources within a moving multi-hop mesh network comprising:

in response to receiving a task-compute request from a first network node to two or more other network nodes for computing a task, wherein the first network node and the two or more other network nodes are mobile nodes, wherein the first network node has a first geographical location relative to a first geographical location of the two or more other network nodes, and wherein the first network node and the two or more other network nodes are configured for communication with each other via a communication mesh network, sending a task-compute offer from at least two of the two or more other network nodes to the first network node for computing the task;

predicting a second geographical location for each of the at least two of the two or more other network nodes relative to a second geographical location of the first network node based on a time when the task will be completed;

predicting a total task completion time for the predicted second geographical location of the at least two of the two or more other network nodes comprising:

a time taken for the first network node to send data to the at least two of the two or more other network nodes for computing the task based on the first geographical location;

a computation time for the at least two of the two or more other network nodes to compute the task; and a time taken for the at least two of the two or more other network nodes to send the output data for the completed task to the first network node from the second geographical location;

comparing the total task completion time predicted for the at least two of the two or more other network nodes to generate an acceptance of the task-compute offer from a given one of the two or more other network nodes; and allocating the task to network resources to the accepted task-compute offer;

wherein predicting the second geographical location of the at least two of the two or more other network nodes relative to the second geographical location of the first network node is determined according to node mobility information associated with each node in the network, the node mobility information comprising one or more of node trajectory and node speed; and wherein the steps of the method are performed in accordance with a processor and a memory.

12. The method of claim 11, wherein each of the first network node and the two or more other network nodes are independently one of a cellular phone, tablet, laptop, desktop computer, drone and robot.

13. The method of claim 11, wherein the step of sending the task- compute offer from the at least two of the two or more other network nodes to the first network node comprises sending communicated messages by one or more of a text message, voice message, audio message, video, data and encrypted message.

14. The method of claim 11, wherein the first geographical location of the first network node and the first geographical location of the two or more other network nodes is determined by a unique identification of the first network node and the two or more other network nodes.

15. The method of claim 11, further comprising sending a notification that a node's task-compute offer is the accepted task-compute offer, and wherein the notification provides the node with further instruction to proceed with the computed task.

16. A system comprising:
a memory and a processor operatively coupled to the memory and configured to implement the steps for allocating tasks to network resources within a moving multi-hop mesh network of:
sending a task-compute request from a first network node to two or more other network nodes for computing a task, wherein the first network node and the two or more other network nodes are mobile nodes, wherein the first network node has a first geographical location relative to a first geographical location of the two or more other network nodes, and wherein the first network node and the two or more other network nodes are configured for communication with each other via a communication mesh network;
in response to the first network node receiving a task-compute offer from at least two of the two or more other network nodes for computing the task, predicting a second geographical location for each of the at least two of the two or more other network nodes relative to a second geographical location of the first network node based on a time when the task will be completed;
predicting a total task completion time for the predicted second geographical location of the at least two of the two or more other network nodes comprising:
a time taken for the first network node to send data to the at least two of the two or more other network nodes for computing the task based on the first geographical location;
a computation time for the at least two of the two or more other network nodes to compute the task; and
a time taken for the at least two of the two or more other network nodes to send the output data for the completed task to the first network node from the second geographical location;
comparing the total task completion time predicted for the at least two of the two or more other network nodes to generate an acceptance of the task-compute offer from a given one of the two or more other network nodes; and
allocating the task to network resources to the accepted task-compute offer;
wherein predicting the second geographical location of the at least two of the two or more other network nodes relative to the second geographical location of the first network node is determined according to node mobility information associated with each node in the network, the node mobility information comprising one or more of node trajectory and node speed.

17. The system of claim 16, wherein each of the first network node and the two or more other network nodes are independently one of a cellular phone, tablet, laptop, desktop computer, drone and robot.

18. The system of claim 16, wherein the step of sending the task-compute offer from the at least two of the two or more other network nodes to the first network node comprises sending communicated messages by one or more of a text message, voice message, audio message, video, data and encrypted message.

19. The system of claim 16, wherein the first geographical location of the first network node and the first geographical location of the two or more other network nodes is determined by a unique identification of the first network node and the two or more other network nodes.

20. The system of claim 16, wherein the processor is further configured to implement the step of sending a notification that a node's task-compute offer is the accepted task-compute offer, and wherein the notification provides the node with further instruction to proceed with the computed task.

\* \* \* \* \*